(No Model.)

I. HEFFRON.
SEWER TRAP.

No. 506,690. Patented Oct. 17, 1893.

Witnesses
Edw. S. Duvall, Jr.
Carroll F. Burritt

Inventor
Isaac Heffron
by Fenelon B. Brock
Attorney

UNITED STATES PATENT OFFICE.

ISAAC HEFFRON, OF GALVESTON, TEXAS.

SEWER-TRAP.

SPECIFICATION forming part of Letters Patent No. 506,690, dated October 17, 1893.

Application filed November 25, 1892. Serial No. 453,119. (No model.)

*To all whom it may concern:*

Be it known that I, ISAAC HEFFRON, a citizen of the United States, residing at Galveston, in the county of Galveston and State of Texas, have invented certain new and useful Improvements in Sewer-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to traps for sewage.

The main object of my improvements is to prevent the grease and other extraneous matter from sinks, and other fixtures in the house to effect a lodgment in the sewer, to the consequent obstruction and clogging up of the same. Such a condition of things is a constant menace to health, and results in costly and frequent repairs.

The invention consists in the following construction and combination of parts which will first be fully set forth and described and the features of novelty then pointed out in the claim.

Figure 1:
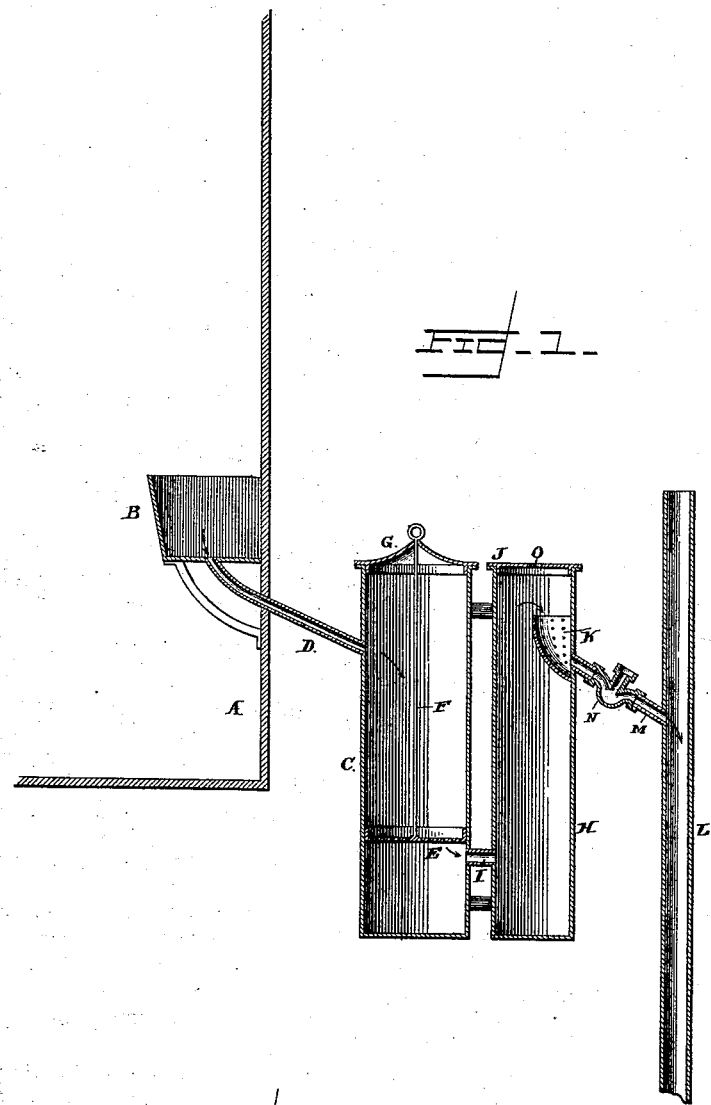
Figure 2:
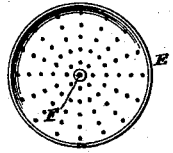

In the drawings—Figure 1 represents a sectional elevation of a device to which I have applied my improvements. Fig. 2 is a detail view of the strainer.

A represents a compartment of a buiding. B is a sink or other fixture therein.

C is a vertical vessel, located within or without the building, to receive the flow of the basin or sink B.

D is a pipe connecting sink B and cylinder C through which the water, grease and sediment enter the latter.

E is a strainer having a flange which snugly fits the interior of the cylinder C. Its normal position is above the discharge pipe I.

G is a cover of the vessel C, and F, a rod attached thereto, and also to the strainer E, by means of which, when the cover is lifted, the strainer is withdrawn from the cylinder and the accumulated grease thereon removed.

It will be seen that a collecting chamber is formed below the normal position of the strainer-piston, and that the discharge-orifice thereof is just below the strainer piston. Any sedimentary matter which may therefore find its way through the piston E, falls into the bottom of the cylinder C, the discharge I being so high up that it does not disturb the sluggish character of the contents by any agitating currents. This collecting chamber is cleaned as occasion may require when the strainer is out of the cylinder. The supplementary cylinder H acts to further check any sediment which may succeed in getting through the pipe I.

Any grease which may pass through the strainer E and enter the vessel H, is caught and held therein.

Vessel H is preferably arranged alongside the vessel C. Pipe I connects the vessels C and H near the bottom thereof.

The cover J of the cylinder H has an opening O for the purpose of ventilating the trap and intercepting the gas or other odors which may find their way in from the sewer.

L is the pipe which connects with the sewer or drain, and M, a pipe leading from cylinder H thereto.

K is a strainer receptacle covering the mouth of pipe M, and is adapted to hold a cake of lye or similar substance, should the discharge at that point contain any greasy particles.

The accumulated grease in the vessel C is intended to be removed at intervals by simply withdrawing the strainer E and replacing the same.

I do not wish it understood that I limit myself to the precise arrangement and construction herein shown, as I may vary the size, shape and material in setting up these sewer traps, as well as their relative arrangement.

I claim—

The combination of two upright cylinders, the first being provided with a reciprocating strainer-piston normally resting some distance from the bottom, a collecting-chamber beneath the piston, and an inlet; and the second cylinder having a cap, a vent, an outlet, and a strainer therefor, both cylinders being provided with a connecting pipe some distance above the bottoms of said cylinders.

In testimony whereof I affix my signature in presence of two witnesses.

ISAAC HEFFRON.

Witnesses:
LEUT M. HITCHCOCK,
JOSIAH MERROW.